Figure 3:
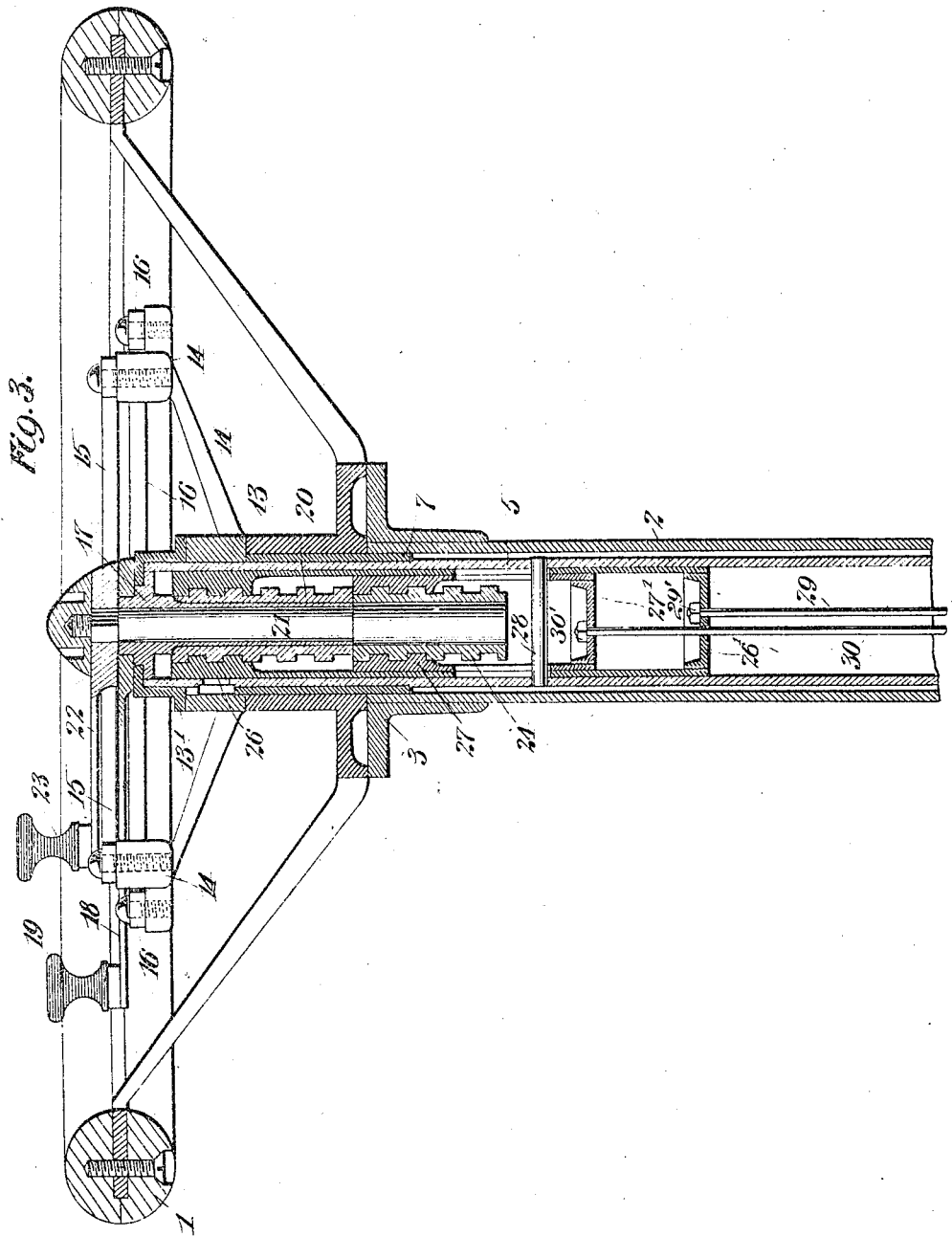

No. 825,593. PATENTED JULY 10, 1906.
G. E. FRANQUIST.
STEERING HEAD FOR MOTOR VEHICLES.
APPLICATION FILED AUG. 11, 1905.
2 SHEETS—SHEET 1.
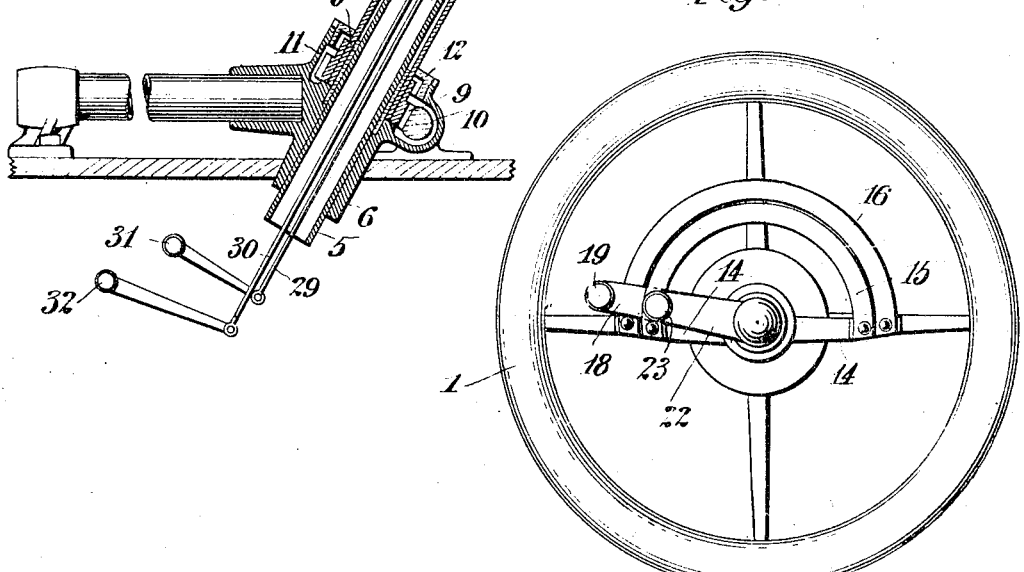
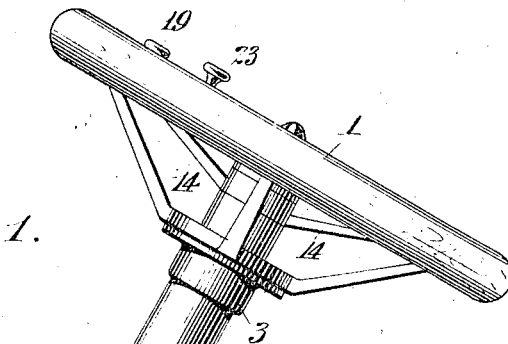
Witnesses
Inventor
Gustave E. Franquist
By his Attorneys No. 825,593. PATENTED JULY 10, 1906.
G. E. FRANQUIST.
STEERING HEAD FOR MOTOR VEHICLES.
APPLICATION FILED AUG. 11, 1905.

2 SHEETS—SHEET 2.

Witnesses
Inventor
Gustave E. Franquist
By his Attorneys

UNITED STATES PATENT OFFICE.

GUSTAVE E. FRANQUIST, OF NEW YORK, N. Y.

STEERING-HEAD FOR MOTOR-VEHICLES.

No. 825,593.     Specification of Letters Patent.     Patented July 10, 1906.

Application filed August 11, 1905. Serial No. 273,718.

*To all whom it may concern:*

Be it known that I, GUSTAVE E. FRANQUIST, a citizen of the United States, residing at the city of New York, in the borough of Manhattan and State of New York, have invented certain new and useful Improvements in Steering-Heads for Motor-Vehicles, of which the following is a full, clear, and exact description.

My invention relates to a steering wheel or head for motor-vehicles.

It is customary to have the engine to a certain extent controllable by levers upon the steering-wheel generally connected to regulate the air-supply and the timing of the ignition-spark. These levers when mounted directly on the wheel change their positons with the movements thereof in the act of steering, which is confusing and objectionable.

One of the objects of my invention is to devise a steering wheel or head having engine-control levers thereon which do not change their position when the wheel is turned.

A further object of the invention is to devise a construction which shall be simple and efficient, easy to manufacture, and having a minimum number of parts.

With these and other objects in view my invention consists in the construction, combination, location, and arrangement of parts, all as will be hereinafter more fully set forth, as shown in the accompanying drawings, and finally particularly pointed out in the appended claims.

In the drawings, Figure 1 is a view in side elevation of a steering wheel or head embodying the principles of my invention. Fig. 2 is a top or end view of the same, and Fig. 3 is a longitudinal sectional view of the main portion of the same.

After a motor-vehicle has once been started and is proceeding normally along the roadway its control is simplified into practically two or three continuous operations—steering and controlling the air and ignition. The latter operations are performed to accord the car to different road conditions and to the hills and grades which are traversed and to the speed which the operator desires at any time, it being evident that a hill or a sandy road requires a large supply of air and a comparatively late spark, while high speed on a level road necessitates an early spark and a less supply of air. Accordingly the air and spark are being continually manipulated, and since the operator's eyes are on the road ahead it is important that he know exactly where to find each lever without taking his eyes off the road ahead. In carrying out my invention I arrange the engine-controlling levers concentrically with the steering head or wheel and provide worm-sleeves by which their motion is transmitted through the shaft of the wheel or head.

Referring now to the drawings and to the various views and reference-signs appearing thereon, in which like parts are designated by the same reference-signs wherever they occur, 1 indicates the wheel or head, and 2 a revoluble shaft upon which the wheel or head is mounted. I construct the shaft 2 in the form of a hollow sleeve having a flange 3 fixed to its upper end, upon which the steering wheel or head 1 is screwed or fastened in any desired way.

5 indicates a stationary tubular frame which is rigidly inset into the base 6 and projects upward inside of the revoluble casing 2, so as to form a bearing-support therefor.

7 and 8 designate bronzes which are disposed between the frame 5 and the revoluble casing 2 to constitute the bearing-surfaces for the parts.

I provide means at the lower end of the revoluble casing 2, by which the motion of the wheel or head 1 is transmitted to the steering-gear, and I have shown a pinion 9, fixed to the lower end of the sleeve, which acts upon a rack-section 10, connected to the steering-gear in any desired way.

11 indicates a portion of the main frame of the machine which surrounds and forms a gear-casing for the gear and rack. The casing is conveniently closed against dust by a screw-cap 12.

Referring now particularly to Fig. 3 of the drawings, I have shown a practical form of means by which the motions of the control-levers are transmitted through the tubular frame 5. At the top of the tubular frame 5 is fixed what I shall term a "supplemental stationary" frame comprising a ring or collar 13, having radially-projecting arms 14, upon which are secured a pair of index-rings 15 16 for a purpose which will presently appear. 13′ denotes a cap which is screwed upon the end of the tubular frame 5 and forms a means for holding the supplemental stationary frame 13 in position and also serves as a limiting or thrust-bearing support for certain revoluble members later to be described. Revolubly supported by the supplemental stationary frame 13 is a member 17, having an arm 18 projecting therefrom and a small handle 19, by which the member may be turned. The member 17 has fixed thereto a worm 20, so that the worm is turned axially whenever the handle 19 is swung back and forth upon the index-ring 16. The member 17 is formed with an axial hole which constitutes a bearing for a second revoluble member 21, upon which is carried a second arm 22 and handle 23. 24 indicates a second worm, which is secured to the member 21. It is evident that when the handle 23 is swung back and forth over the index-ring 15 the worm 24 will be turned in the same manner that the worm 20 is moved by the handle 19. By virtue of the cap 13', previously mentioned, which enters an annular space in the revoluble member 17, the latter is prevented from longitudinal movement in either direction, but can only move rotatably. In a similar way the revoluble member 21 is precluded from any endwise movement by the engagement of its arm 22 and worm 24 with the ends of the revoluble member 17. Around the worm 20 and 24 I arrange a pair of what I shall term "worm-casings" 26 and 27, which telescope within one another and within the tubular frame 5, so as to be independently movable longitudinally but not rotatably therein. In order to preclude rotative movement of the worm-casings, I may use a key or any equivalent device, such as the pin 28, fixed to the tubular casing 5 and extending through alined slots in each of the tubular casings 26 27. 26' and 27' indicate portions of the worm-casings 26 and 27, to which the rods 29 and 30 may be attached. The rods 29 and 30 extend downward through the tubular frame 5 and are operatively connected to the controlling-shafts 31 and 32 in any convenient way.

It will be seen that the tubular frame 5 is stationary under all circumstances and constitutes a support for all the other parts. The steering wheel or head 1 may be manipulated at the pleasure of the operator, by which the revoluble sleeve 2 is turned upon the tubular frame 5 to steer the vehicle in any direction. Under these circumstances, however, the supplemental stationary frame 13 remains immovable and with it each of the controlling-handles 19 and 23. At any time the handle 19 may be moved, which swings the worm 20 through a part of a revolution, so that the worm-casing 26 is moved up and down within the tubular frame 5, so as to manipulate the controlled shaft 31. In like manner the handle 23 may be turned at any time to move the controlled shaft 32, and it is obvious that either of these things may be done simultaneously or at different times without in any way affecting the other or the manipulation or control of the steering wheel or head.

I am aware that it is not broadly new to secure the control of a motor-vehicle from the steering wheel or head; but I regard the features of construction herein set forth as accomplishing all the desired purposes with a minimum number of parts and the highest efficiency of operation.

A feature of my invention relates to the possibility of independent movement of the worm-casings 26 and 27 and the controller-rods 29 and 30. It will be observed that the rods 29 and 30 pass through openings in the bottom walls 26' and 27' of their respective worm-casings and are held by nuts 29' and 30'. In normal operation the rods 29 and 30 are both under tension, (by gravity or in any other suitable way,) so that they take any movement applied to the worm-casings. Should it happen, however, that either of the rods has an independent governor-control, as is accomplished in my pending application, Serial No. 262,422, either of the rods may slide upward through the perforated plates 26' and 27' and accommodate the independent control of the governor. In this way the vehicle is simultaneously controllable from the governor and from the steering-head.

What I claim is—

1. A steering wheel or head comprising a tubular frame, a revoluble casing on said tubular frame and carrying a steering-wheel, a pair of longitudinally-movable worm-casings within said tubular casing, and a pair of worms for moving said casings, and having a movement coaxial with said wheel.

2. In a steering wheel or head, a tubular frame, a revoluble casing thereon, a supplemental stationary frame secured to said tubular frame, index-rings on said supplemental stationary frame, arms moving over said index-rings, and means for transmitting movement of said arms through said tubular frame.

3. In a steering wheel or head, a tubular frame, a revoluble casing thereon, a supplemental stationary frame secured to said tubular frame, a revoluble member carried by said supplemental frame, and means for transforming the rotative movements of said member into longitudinal movements through said tubular frame.

4. In a steering wheel or head, a tubular frame, a revoluble sleeve supported thereon and carrying a steering-wheel, a supplemental stationary frame secured to said tubular frame, a pair of revoluble arms supported by said supplemental stationary frame, and means whereby the movement of each of said arms is independently transmitted through said tubular frame.

5. In a steering wheel or head, a stationary tubular frame, a supplemental stationary frame thereon, a pair of index-rings secured to said supplemental stationary frame, arms moving over said rings, worms secured to said arms, worm-casings surrounding said worms and connections from said worm-casings to the controlled parts.

6. In a steering wheel or head, a stationary tubular frame, a revoluble sleeve thereon, a supplemental stationary frame, a pair of revoluble members rotatably but non-longitudinally movable in said supplemental stationary frame, worms on said revoluble members, and worm-sleeves having connections to said parts incasing said worms.

7. In a steering wheel or head, a stationary tubular frame, a revoluble sleeve carrying a steering-wheel surrounding said tubular frame, a supplemental stationary frame fixed on said tubular frame, a pair of revoluble members rotatably but non-longitudinally movable within said supplemental stationary frame, worms on said members, a pair of telescoping worm-sleeves longitudinally but non-rotatably supported within said tubular frame, and connections from said sleeves to the controlled parts.

8. In a steering wheel or head, a stationary tubular frame, a revoluble sleeve carrying a steering-wheel surrounding said tubular frame, a supplemental stationary frame secured to said tubular frame, a pair of index-rings fixed on said supplemental stationary frame, a cap constituting a thrust-bearing, a pair of coaxial revoluble members rotatably but non-longitudinally movable in said thrust-bearing, arms projecting from said members and moving over said index-rings, worms on said revoluble members, a pair of longitudinally but non-rotatably movable worm-casings telescoping within one another and within the tubular frame, and engaging said worms, and connections from said worm-sleeves to the controlled parts.

9. In a steering wheel or head, a stationary tubular frame, a revoluble sleeve carrying a steering-wheel surrounding said tubular frame, a pinion on said revoluble sleeve, a rack-section engaging said pinion and operating the controlled parts, a gear-casing having a cap surrounding said gear and rack, connections extending through said tubular frame for operating any desired parts, and means coaxially revoluble with said wheel for moving said connections.

In witness whereof I subscribe my signature in the presence of two witnesses.

GUSTAVE E. FRANQUIST.

Witnesses:
 FRANK S. OBER,
 WALDO M. CHAPIN.